US007000410B2

(12) United States Patent
Hutchinson

(10) Patent No.: US 7,000,410 B2
(45) Date of Patent: Feb. 21, 2006

(54) APPARATUS AND METHOD FOR PRODUCING WATER FROM AIR

(75) Inventor: John Hutchinson, Silver City, NM (US)

(73) Assignee: Ecotek International, Inc., Silver City, NM (US)

( * ) Notice: Subject to any disclaimer, the term of this patent is extended or adjusted under 35 U.S.C. 154(b) by 0 days.

(21) Appl. No.: 10/977,143

(22) Filed: Oct. 29, 2004

(65) Prior Publication Data

US 2005/0097901 A1    May 12, 2005

Related U.S. Application Data

(60) Provisional application No. 60/519,308, filed on Nov. 12, 2003.

(51) Int. Cl.
    *F25D 17/06*  (2006.01)
(52) U.S. Cl. ............................ 62/93; 62/285

(58) Field of Classification Search .................. 62/93, 62/272, 285, 291; 95/269
See application file for complete search history.

(56) References Cited

U.S. PATENT DOCUMENTS

| 4,050,262 A * | 9/1977 | Mehnert ........................ 62/160 |
| 6,398,919 B1 * | 6/2002 | Kuboyama ..................... 203/49 |
| 6,524,373 B1 * | 2/2003 | Afeiche et al. ............... 95/269 |

* cited by examiner

*Primary Examiner*—Melvin Jones

(57) ABSTRACT

An apparatus and method are extracting water from the ambient air comprising drawing air through an particle ionizer grid, evaporator plates of a refrigerant system the system and recirculating the ionized air and mixing said ionized air with ambient air and recycling said mixed air through said ionizer and evaporator plates to extract moisture from the air. The system utilizes sensors to constantly sense and predictively respond to multiple parameters, monitored at multiple points in the system to predictively and efficiently adjust the system operation to continually maximize the extraction of water regardless of ambient temperature and humidity.

10 Claims, 4 Drawing Sheets

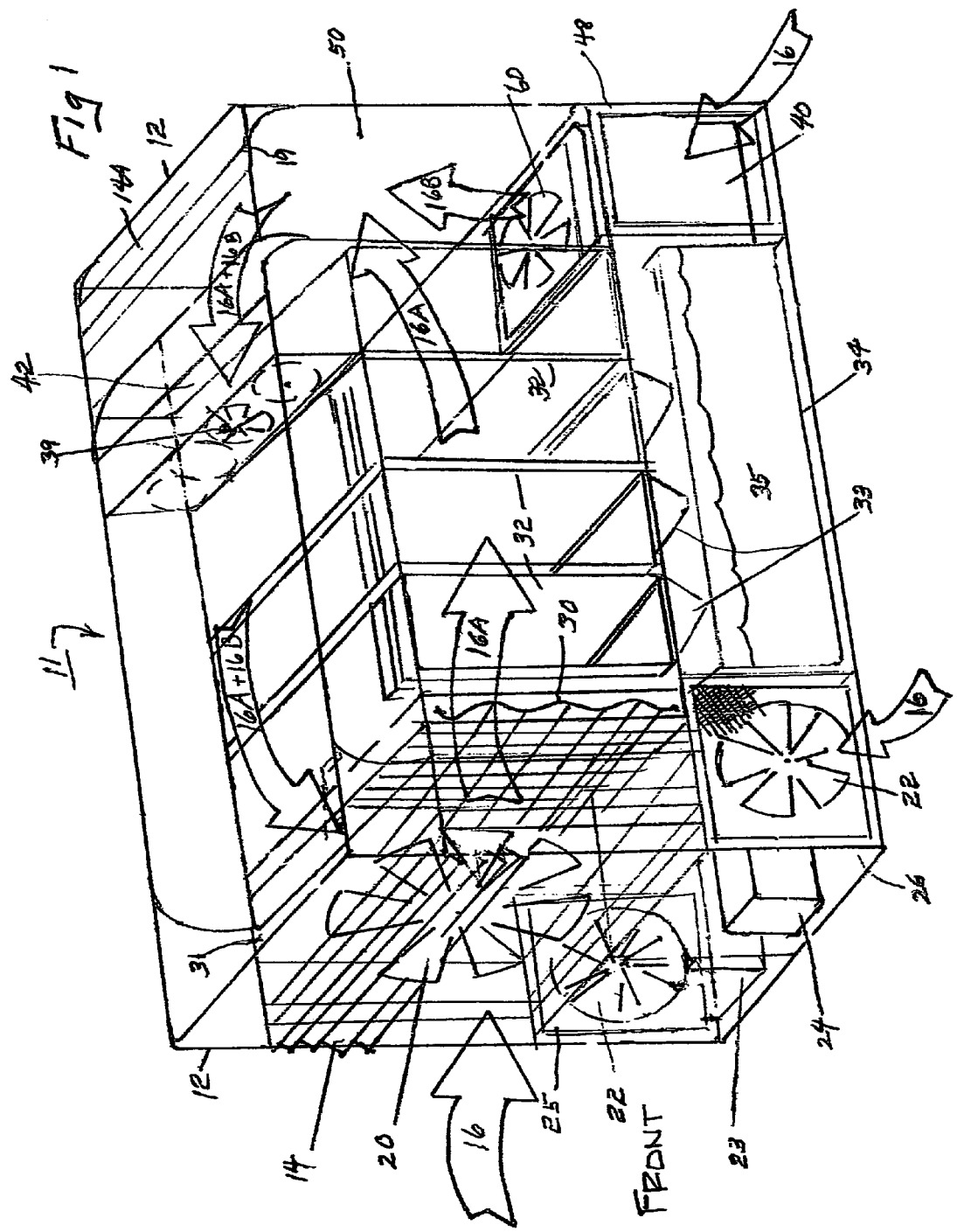

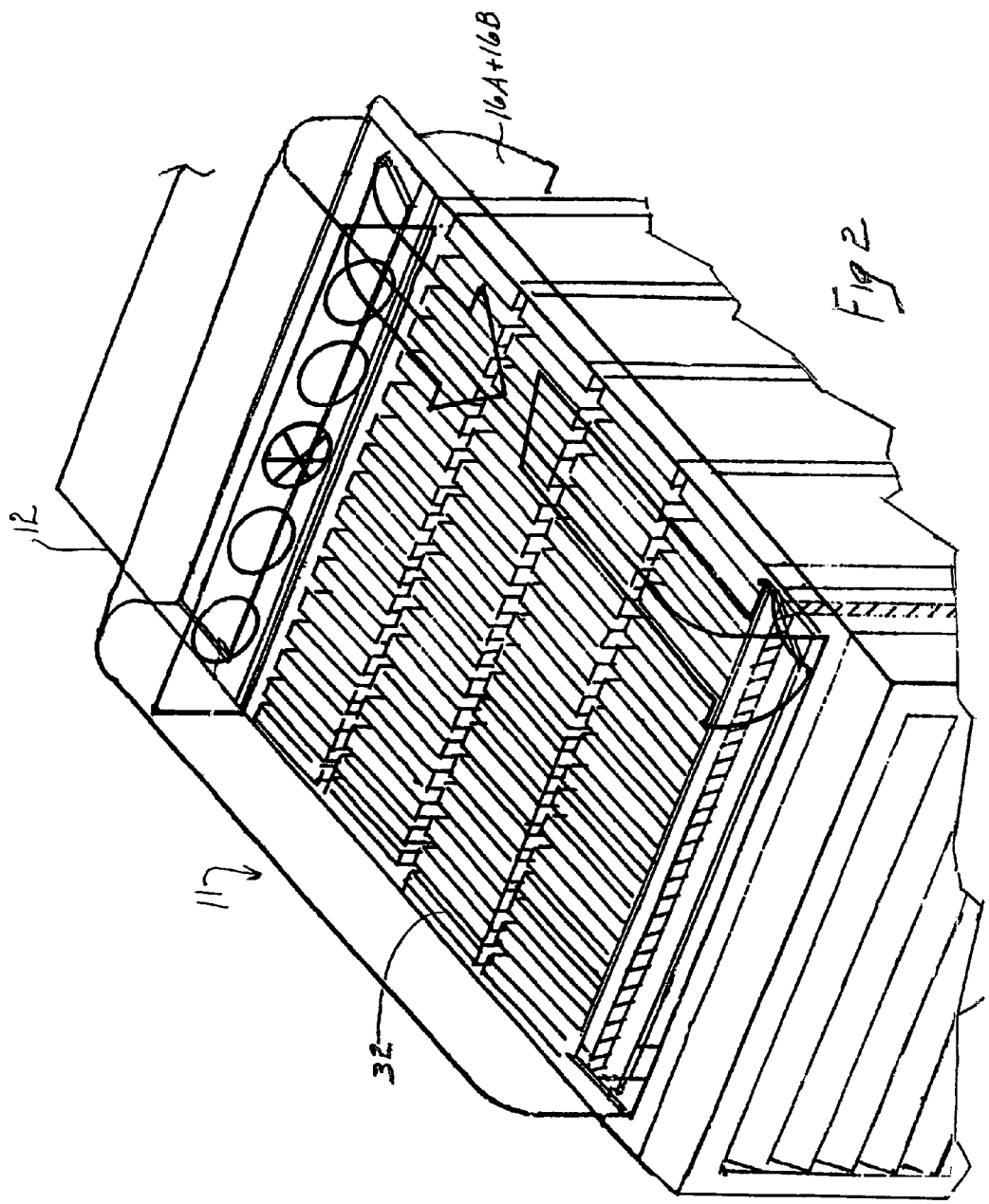

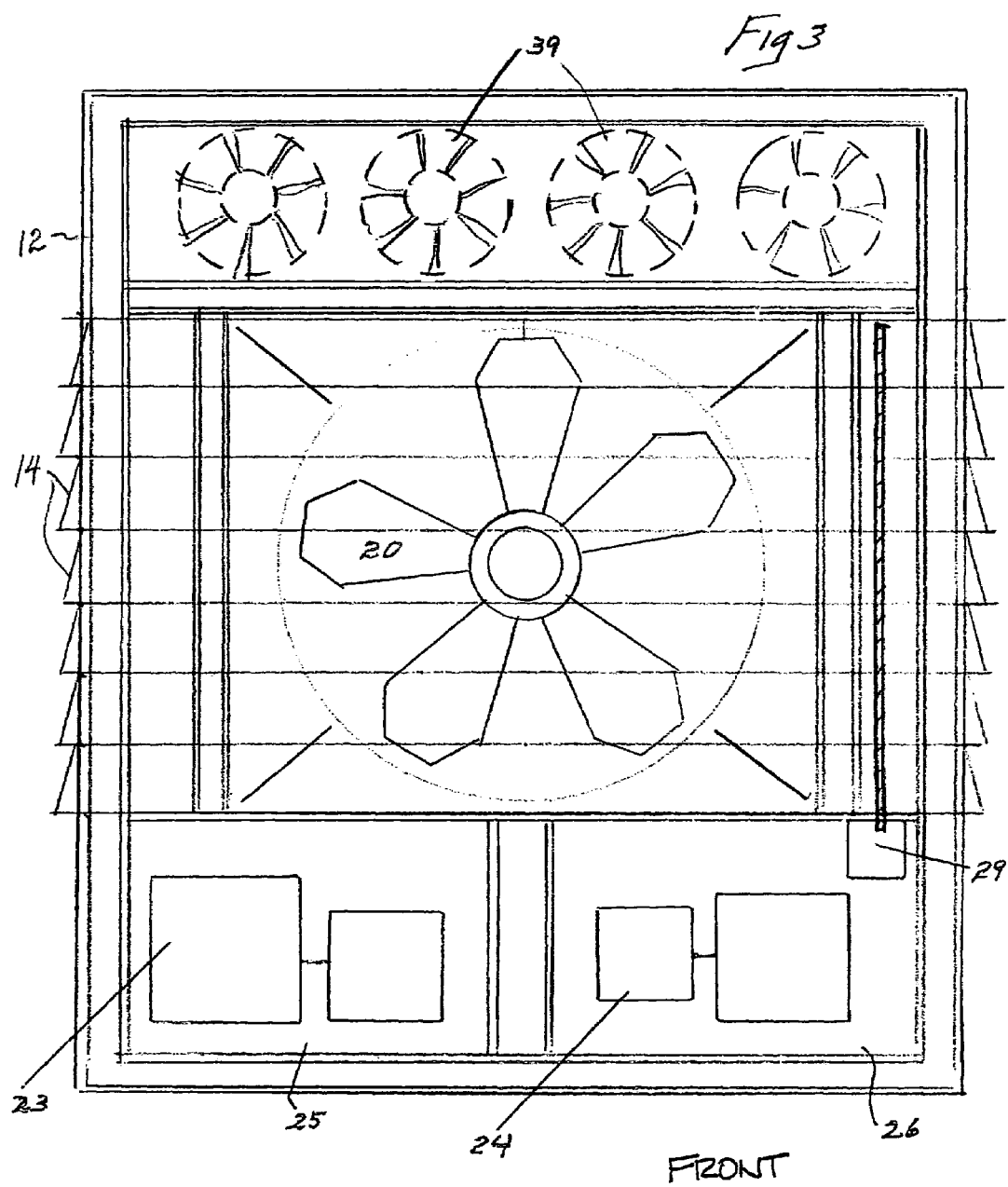

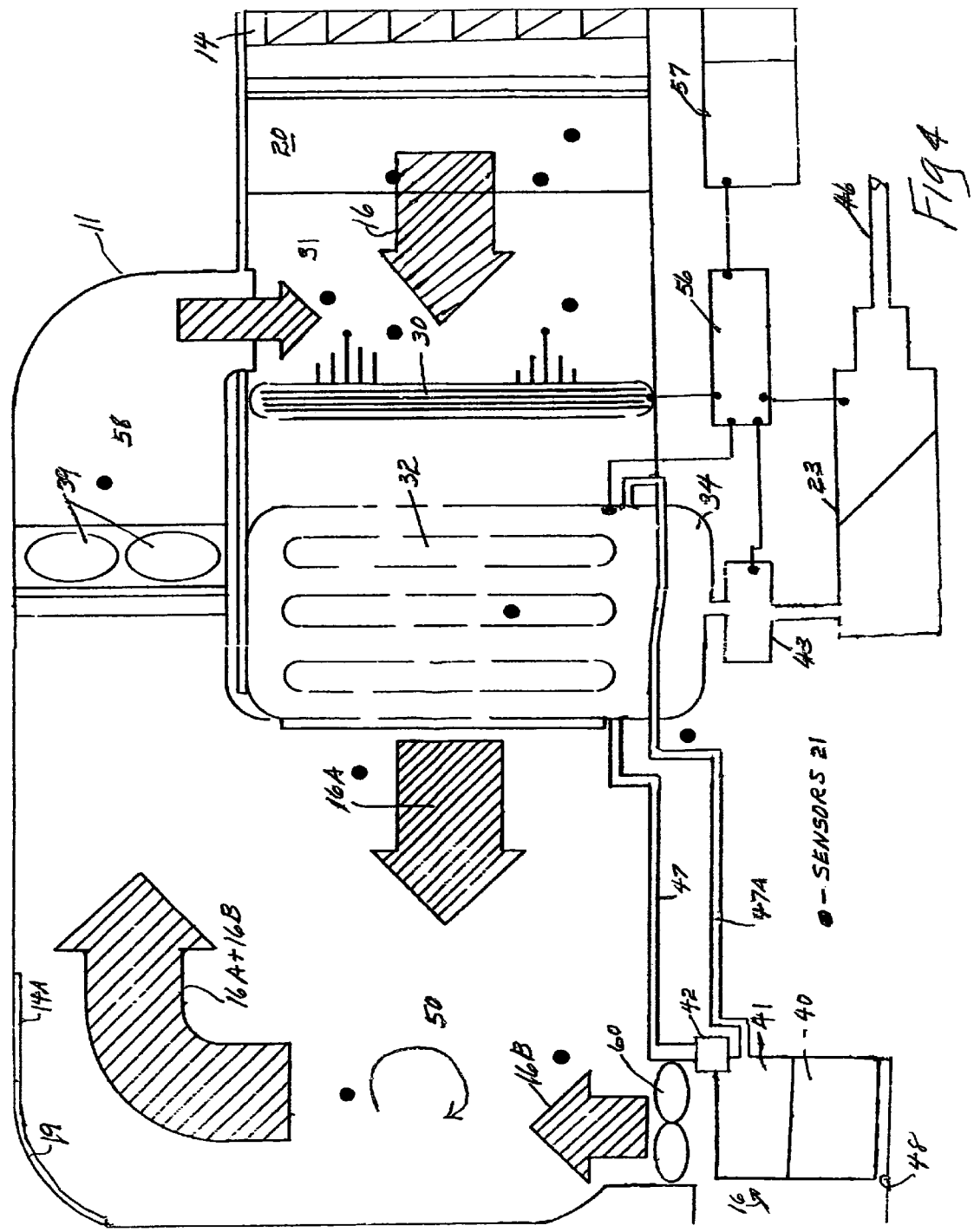

APPARATUS AND METHOD FOR PRODUCING WATER FROM AIR

The present application claims the priority date of U.S. patent application Ser. No. 60/519,308 files on Nov. 12, 2003 in the name of John Hutchinson, the same inventor hereof.

TECHNICAL FIELD OF INVENTION

The present invention relates to an apparatus and method for producing, that is, extracting water from the moisture in atmospheric air.

BACKGROUND OF INVENTION

There are many areas of the world in which fresh water is in critical demand. Also, there are many instances where fresh water is in demand for emergencies, such as when a water line to a given area is destroyed.

Many methods and apparatus are in use to recover fresh water from salt water or brackish water. Methods and apparatus are also known that remove moisture from air, either to reduce humidity or to generate fresh drinking water. Recently a number of companies have developed relatively small units to produce fresh drinking water, and many patents have been issued directed to such products, including U.S. Pat. Nos. 5,400,607; 5,259,203; and 5,056,593. However, It has been found that the apparatus and methods as disclosed in the prior art, although quite workable, appear to be relatively in efficient in extracting water from the ambient air; or, said machines are dependent on high moisture content in the air, and/or just do not provide significant outputs of fresh water.

SUMMARY OF INVENTION

An apparatus and method are disclosed for efficiently extracting significant quantities of water from the air. The inventive equipment utilizes a condenser type refrigerant system to extract the water from the air. Condenser type refrigerant systems, per se, are known in the art; however in the inventive system, unique techniques are utilized that include means for drawing air through the system and recirculating the air through an air ionizer enabling the extraction of maximum moisture from the air. In addition, sensors that are mounted at multiple points in the system, constantly sense and predicatively respond to multiple parameters to efficiently operate the system to continually maximize the extraction of water from the air regardless of ambient temperature and humidity. The process of constant monitoring by the multiple sensors as well as creating a stable air mixing/weather chamber for recirculated air, coupled with the capability to coalesce relatively higher amounts of water vapor on each particle of air results in a stable environment for extraction of water vapor in the air. These features eliminate the variations in output of prior art units. Fuzzy logic modules in the system are fed by the multiple sensors and computer logic sequences are tested and updated to thereby create a unique logic through repetition.

The foregoing features and advantages of the present invention will be apparent from the following more particular description of the invention. The accompanying drawings, listed herein below, are useful in explaining the invention.

BRIEF DESCRIPTION OF THE DRAWINGS

FIG. 1 shows a sketch of the inventive system that also indicates the recirculating air flow and the mixing of incoming ambient air with a previously cooled air; FIG. 1 also shows the re-circulation of the air through a high intensity electrostatic field;

FIG. 2 is a sketch of a partial overhead view to show the multiple evaporator plates and depicts the recycling air flow over the evaporator plates;

FIG. 3 is a front view of the system housing; and

FIG. 4 shows an outline of the system of FIGS. 1 and 2 and indicates the multiple sensors positioned throughout the system.

DESCRIPTION OF INVENTION

FIG. 1 shows a view of the inventive water producing or water extracting system 11. The system 11 is a unique and a significant improvement over known types condensing units for extracting water from the ambient air. In one embodiment of the invention, the housing 12 for the system 11 is approximately 16 feet in length, 4 feet in width and 8 feet in height and preferably made of stainless steel. The housing 12 comprises a standard type of construction including an inner wall, an outer wall and insulation between the two walls. The housing and system are designed for portability.

Refer now to FIG. 3 as well as FIG. 1. Metal louvers 14 are mounted at the front of the housing 12. The louvers are hydraulically controlled by a hydraulic actuator 29 to close and open, controllably allowing the ambient air 16 into the system. A fan 20 mounted in the front of the housing and behind the louvers 14 pulls the ambient air 16 into the housing in a horizontal front to back direction. In the embodiment of FIGS. 1 and 3, the fan 20 is approximately 36 inches in diameter and is hydraulically operated both in speed of rotation and blade pitch. A hydraulic apparatus, of known design, indicated by numeral 24, is mounted in a compartment 26 beneath the fan. Water pumps and purifying equipment 23, of known design, are located in a compartment 25 located adjacent compartment 25.

Refer now to FIGS. 1 and 2. Note that FIGS. 1 and 2 are relatively reversed with respect to each other to better show various features of the invention. A chamber 31 is formed behind fan 20 for purposes which will become clear. Next, a particle ionizer, electrical ionizer grid 30 is positioned behind the fan 20 and mounted transverse to the air flow. The grid extends across the width of the housing 12. The ionizer grid 30 is formed of stainless steel and copper and is a known type of ion grid utilizing a high voltage. In operation, as the air particles pass through the ionizer 30, the particles are charged positively or negatively. It has been found that water vapor adheres better or more fully to a charged particle, with the result that more water vapor collects on a charged particle than would collect on a non-charged particle. This concept is utilized in the present invention.

Next an array or banks of flat plate evaporators (air cooling) plates 32, of suitable known design, are mounted behind the ionizer grid 30. FIG. 2 shows a top view of the banks of plates 32. Refer no also to FIG. 4 that shows the refrigerant system of the invention including the banks of plates 32 connected to receive a glycol mixture of cooling liquid from the condenser 41 through suitable valving 42 and lines 47, as indicated in FIG. 4. The glycol mixture is pumped through the evaporators plates 32 and returns through lines 47A to recycle the operation, as is well known.

Referring again to FIG. 1, V-positioned plates 33 that function as water collectors are mounted under the evaporator plates 32. The V-shaped plates direct the water 35 to a holding tank 34. FIG. 4 shows the pumps 43, of known design that remove the water from the holding tank 34, and pass it through standard filters and purifiers 23 to an outlet line 46 for use.

FIGS. 1 and 4 show an air mixing chamber 50 that is formed behind the evaporator plates 32 (note again that the view of FIGS. 1 and 4 are relatively reversed). In the embodiment of the invention being described, air mixing chamber 50 has the approximate dimensions of 4 ft. in length, 4 ft. in width and 4 ft. in height and forms the rear part of the housing 12. Chamber 50 has an outlet 19 and associated louvers 14 that permit air to controllably exit from housing 12 to the atmosphere.

As best seen in FIG. 4, a fan 60 pulls ambient air 16 into the chamber 50. The ambient air passes over the compressor 40 and condenser coils 41 and cools the equipment and enters chamber 50 as warmer moist air 16B. In chamber 50, the warm air 16B is pushed upwardly and mixes with the cooled ionized air 16A that exits the cooling plates 32. As shown in both FIGS. 1 and 4, the mixed air 16A+16B is drawn upwardly into a feedback conduit 58 by a group of fans 39 and is fed into input chamber 31 and mixed with air in the main air stream 16 provided by fan 20. This air flow 16+16A+16B is then further ionized and cooled. As can be readily appreciated the air is thus caused to flow in a recycling loop.

The motor/compressor 40 and the condenser 41 are of standard design and are mounted in the lower section of chamber 50. As mentioned, fans 60 pull ambient air 16 through a side inlet that provides ambient air for cooling the condenser 41.

Multiple sensors 21, indicated by the large black dots in FIG. 4 are mounted throughout the system. In one embodiment some twenty-five sensors are used. The sensors 21 selectively sense temperature, humidity, dew point, rpm of the various fans, pitch of the fans, cfm (cubic feet per minute) of air flow, voltage, current, coolant, pressure etc., that is, the sensors monitor all of the pertinent parameters of the operating system. The sensors 21 are of suitable known types and mounted to best determine the parameter being monitored. A microprocessor module or chip 56 receives and processes the outputs from the sensors 21. A microprocessor controller 57 is connected to module 56. As noted above, a) the process of mixing the ambient air and the ionized air, b) the temperature and flow volume of the coolant provided to the evaporator plates 32 to cool the air below the dew point, and c) the process of adjusting the air that is fed back into the main air steam an all other system components are controlled by microprocessor module 56 in response to inputs from the sensors 21. A fuzzy logic program is utilized by the microprocessor module 56 is employed to provide predictive and learned control for the system.

The operation of the system will now be described in further detail. Ambient air 16 is controllably pulled into the system by the fan 20. The incoming air 16 passes through an air filter system and is then forced through the ionizer grid 30. The air 16 is ionized and the air particles are positively or negatively charged and exit as ionized air 16A.

As mentioned above, it has been found that the water vapor collects more on the charged air particles than would collect normally on non-charge particles and forms relatively larger globules of water. When the charged particles, charged by the ionizer grid 30, pass by the plate evaporators (cooler) plates 32, the ionized air 16A particles tend to stick better or more fully to the evaporators plates 34. As the air cools below the dew point, moisture is extracted from the air. That is, the water vapor on the air particles condenses and through gravity falls into the water collector tank 34. The air flow continues into an air mixing chamber 50.

Refer now to FIG. 4 and air mixing chamber 50. (Note that FIG. 1 is relatively reverse from FIG. 4.) The ambient air 16 is pulled in by fans 60 into chamber 50. As it is drawn into chamber 50, the ambient air 16 passes through the motor/compressor 40 and hot condenser coils 41 and helps cool the condenser coils and becomes relatively warm. This warm moist air 16B is mixed with the cold ionized air 16A exiting the cooling plates 32. Fans 39 mounted in a feedback conduit 58 draw the air from chamber 50 upwardly over the evaporator plates and back to input chamber 31 in front of the ionizer grid 30 and into the main air flow.

Air mixing chamber 50 is configured to swirl and mix the air inputs, as indicated by the arrows in FIG. 4.

In response to the inputs from sensors located in chamber, sensors 21 cause the warm moist air 16B and the ionized colder air 16A to be mixed until a temperature and specific humidity is obtained as determined by the sensors located in chamber 50. The fans 39 draw this mixed air through return conduit 58. Conduit 58 conveys the mixed air 16A and 16B back into the main air stream to be re-circulated through the air cooling plates 32 to re-cycle the air. This recirculation of the air through the ionizer 30 and the plates 32 provides a significant increase in the efficiency and in the total water output of the system 11.

Some other system details will now be described. The entering ambient air 16 is drawn through the fan 20 at between 10 cfm and 2500 cfm. The box or module for mounting the fans is formed of stainless steel. A system of hydraulically operated slats 14 open and close under the control of a motor drive which responds linked to the system microprocessor which, in turn, is linked to sensors that measure ambient air temperature, humidity and dew point, etc. The monitoring system for the louvers is also linked to the motors that determine the rotational speed (rpm) of the fan 20. The sensor output is used by the microprocessor 56 as one of the parameters to measure and calculate the cubic feet per minute of air required to condense the maximum amount of water at the various temperatures and humidity; this is done in a continuous manner.

The plate evaporators 32 are mounted within a stainless steel insulated rectangular tube and comprise four rows of collector plates. The plate evaporators are fed by the and motor 40 compressor 41, which pump a glycol mixture through valve 42 and lines 47 to evaporators 32. The fluid then circulates back through lines 47 to the condenser coils; the fluid is circulated at a relatively low fluid pressure. As noted above, the mixed air and the ambient air passing over the evaporators are cooled below the dew point and condense, resulting in the extraction of water from the air. The air being recycled and processed is thoroughly mixed and comprises new ambient air entering through the inlet chamber 31 and mixed air coming through conduit 58. The cycle automatically repeats.

The foregoing cycling can be appreciated from FIG. 4 and mixing/weather chamber 50. The updraft air fans 60 draw warm air 16B that has passed over the hot condenser coils up through the condenser compartment 48 to mix with cool air 16A coming from the evaporators. This action causes the air in chamber 50 to become more dense with water vapor. When the selected proper temperature and humidity of the air in the air mixing chamber 50 are attained, the mixed air comprising 16A and 16B exits through t 58 and the air is cycled backed over the array of evaporators 32 by the bank of fans 39 and air is pushed down into the inlet chamber 31 where it mixes with ambient air 16. The mixed air then again passes through the ionizer module 30, to be charged, and is once again passed through the plate coil evaporators 32 to condense and provide water globules. The sensors and the microprocessor modules automatically control the entire process.

The pumps for the compressor and filter systems are monitored by the microprocessor modules 56 and computer control 57 turn the motor compressor 40 pumps fluid on and off as determined by the program and microprocessor module 56. The louvers 14 and the fans 20 are opened and adjusted under the control of the microprocessor modules to admit the needed ambient air at specific temperatures and humidity in response to the data obtained by the sensors to thereby create maximum water condensing on the flat plate collectors.

The ionizer or ion particle generator grid 32 is constructed from stainless steel and high tensile copper wires. The wires are strung across the width of a plate frame with a 3/16 inch horizontally spacing between the wires. Rows of wires fill the frame from top to bottom. In the center of each row a wire is attached to the front rows pointing into the air mainstream. The front rows of wires are attached by shielded hi-voltage wire to a transformer. The rear wires are attached to transformer ground to set up an ion field. The incoming air if forced through this ion field, and particle ionization occurs. The operation of the ionizer grid is standard and well known.

The ion field provided grid 30, in concert with an exact control of the temperature and humidity of the air prior to the air being forced across the flat plate collector banks, enables larger coalesced particles to stick to the cold sink of the plates. Also the air recirculating from the mixing chamber 50 back into the main air stream in inlet chamber 31, provides air that has picked up more water vapor on the air particles in the air mixing chamber 50. This air which is again forced across the ion field where it coalesces even more. The system continues this automatic cycle. The advantageous result is that a higher percentage of moisture is gathered, and secondly the output of collected water on a consistent basis is stabilized throughout a range of varying ambient temperatures and humidity.

Stated in another way, the process of constant point monitoring of the system operation by multiple sensors in addition to creating a stable mixing chamber to draw and mix ambient air with recirculating ionized air coupled with the capability to coalesce a higher amount of moisture on each particle, results in a stable environment for air and water vapor.

The system microprocessor module 56 preferably utilizes fuzzy logic algorithms for control operation. The system and computer logic sequences are tested millisecond intervals thereby creating a system logic through repetition. This enables the changing air flow to be anticipated. Air is caused to flow through the system at the proper amount and at an exact timing to keep a stable flow within the system while taking into account the variations in ambient temperatures and humidity. Basically the inventive system anticipates the required air flow, and forces air through the system to provide a maximum output regardless of the varying ambient temperatures and humidity.

The microprocessor module 56 shown in FIG. 1 and computer control collect and process the data from sensors such as humidity, dew point, temperature, fan speed, ion level, fluid pressures, ambient air, voltages, water purification quality as a diagnostic and control program for the system 11.

While the invention has been particularly shown and described with reference to preferred embodiments thereof, it will be understood by those skilled in the art that various changes in form and details may be made therein without departing from the spirit and scope of the invention.

What is claimed is:

1. A system for extracting water from ambient air, said system comprising,
   a) a housing;
   b) first fan means for drawing ambient air into a first section of said housing;
   c) a particle ionizer, said fan means driving said ambient air through said ionizer to ionize the air;
   d) a refrigerant system including evaporator plate array positioned to have the ionized air pass adjacent said plate array to cool said air, said refrigerant system cooling said air to a temperature below the dew point of said air to cause water vapor condensation on said plates.
   e) second fan means for drawing ambient air into a second section of said housing;
   f) chamber means for mixing said ionized air and ambient air; and
   g) a conduit for conducting said mixed air from said chamber means to re-circulate and feed back into the stream of air inputted into said ionizer; and,
   h) means for collecting the water condensed on said plates.

2. A system as in claim 1 further including
   a) microprocessor means;
   b) sensor means for sensing multiple system criteria including temperature of ambient air, the humidity of the air, the dew point; and
   c) software program means for enabling said microprocessor means to predicative provide control commands in response to inputs from said sensor means whereby the system is caused to provide a maximum output of condensation regardless of temperature and humidity variations.

3. A method of extracting water from air, said method consisting of the steps of:
   a) drawing a first volume of air into a housing;
   b) ionizing said air;
   c) cooling said air;
   d) drawing a second volume of air into said housing; and
   e) mixing said ionized air with said second volume of air.

4. A method of extracting as in claim 3 further including the steps of
   a) providing a housing having at least two separate chambers;
   b) drawing ambient air into a first of said chambers;
   c) driving said ambient air in said first chamber through an ionizer;
   d) passing the ionized air over said plates to cool said air;
   e) cooling said air to a temperature below the dew point of said ionized air;
   d) drawing warm ambient air into the second of said chambers;
   e) mixing said cool ionized air and warm ambient air; and
   f) conducting said mixed air to re-circulate and feed back into the stream of air inputted into the ionizer.

5. A method as in claim 3 wherein
a) when said ionized air is cooled below the dew point water vapor coalesces and develops relatively large water globules on said ionized air particles.

6. A method as in claim 3 further including the steps of:
a) sensing multiple system criteria including the temperature of ambient air, the humidity of the air, the dew point, etc.; and
b) applying fuzzy logic algorithms for predicatively providing control commands in response to inputs from said sensor means.

7. A system for extracting water from air, said system comprising,
a) a housing for the system;
b) first means for drawing ambient air into said housing;
c) an ionizing grid for ionizing said drawn air;
d) a refrigeration subsystem for cooling said drawn air below its dew point; and
f) means in said housing for recirculating said drawn air; and
g) water collecting means mounted to receive water from said refrigeration subsystem.

8. A system as in claim 7, said system further comprising
a) said housing includes a main air inlet housing for the system;
b) a fan for drawing ambient air into said housing;
c) an array of water evaporator water condensing plates positioned to have air pass through said array to cool said air;
d) a refrigeration subsystem comprising a compressor, a refrigerant liquid that is compressed by said compressor, said evaporator plates receiving and expanding said liquid and whereby the liquid cools said evaporator plates to a temperature below the dew point of ambient air drawn into said housing; and
e) a particle ionizer positioned in the path of the ambient air drawn into said housing;
f) said housing being configured to provide a return path for said ambient air to recirculate said ambient air through said ionizer and said array of condensing plates; and
g) water collecting means mounted to receive water from said water condensing plates.

9. A system as in claim 8 wherein
a) said housing includes a second inlet for drawing ambient air into said housing, said second inlet being positioned to enable ambient air to be drawn over said compressor to cool said compressor;
b) said housing includes a mixing/weather chamber wherein said ionized air is mixed with air drawn through said second inlet; and
c) said housing includes conduit means for recirculating said mixed air with air entering said housing through said main inlet.

10. A system as in claim 7 wherein said ionizing grid is an electrostatic grid.

* * * * *